June 16, 1931.  G. M. BUCEY  1,810,462
PURIFYING TANK
Filed Sept. 24, 1928

INVENTOR.
George M. Bucey.
BY
ATTORNEY

Patented June 16, 1931

1,810,462

UNITED STATES PATENT OFFICE

GEORGE M. BUCEY, OF ENGLEWOOD, MISSOURI, ASSIGNOR OF ONE-HALF TO JOSEPH D. CHANSLOR, OF KANSAS CITY, MISSOURI

PURIFYING TANK

Application filed September 24, 1928. Serial No. 308,115.

My invention relates to liquid-purifying apparatus, and more particularly to solvent-clarifying devices for use in dry cleaning plants, the principal objects of the invention being to increase the contact of a solvent with cleaning material in a clarifier, to separate impurities centrifugally from the solvent, to retain relatively impure solvent while clear solvent moves from the clarifier, to trap gas, and to trap impurities that tend to float on the solvent.

In accomplishing these and other objects of the invention, I have provided improved details of structure, the preferred forms of which are illustrated in the accompanying drawings, wherein.

Figure 1:
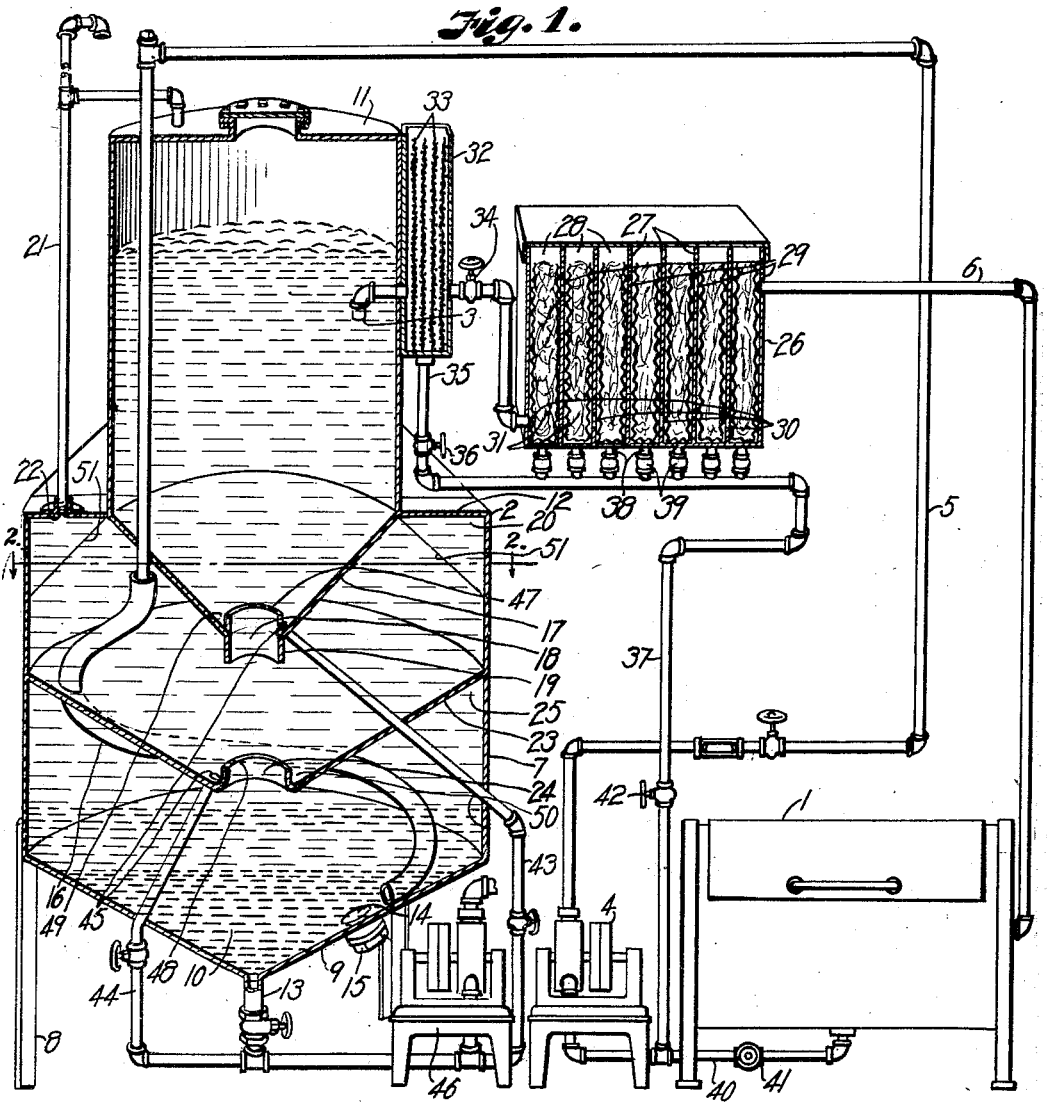
Fig. 1 is a central sectional view partly diagrammatic of cleaning apparatus including a tank and filters constructed in accordance with my invention.
Figure 2:
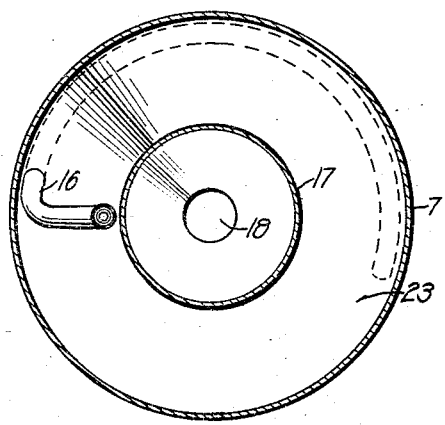
Fig. 2 is a cross sectional view of the tank on the line 2—2, Fig. 1.

Referring in detail to the drawings:

1 designates a washer of ordinary construction such as is used in dry cleaning plants, 2 a tank having an outlet 3 adjacent its upper end, and 4 a pump for moving a solvent from the washer through an inlet conduit 5 for delivery into the bottom of the tank, the solvent rising in the tank to cover the outlet and moving by gravity through a conduit 6 back to the washer, whereby continuous circulation of the solvent through the tank and washer is provided for.

The tank 2 comprises a purifying member of the system, and is preferably cylindrical and consists of a lower portion or reservoir 7 supported on legs 8 in spaced relation with a floor, and having a concave conical bottom 9 forming a sump 10, and a tower-like member 11 of less diameter than the reservoir and supported therefrom concentrically therewith by a horizontal annulus or flange 12 extending inwardly from the upper edge of the lower portion.

The bottom 9 has a valved drain outlet 13 at its apex and a relatively large opening 14 closed by a cap 15 providing access to the sump.

The inlet conduit extends into the tank and a curved tube 16 is mounted on the end of the conduit and arranged spirally in the tank so that its outlet end rests on the bottom adjacent the wall and is directed transversely of the tank. The caustic material is designed to partly fill the sump, and the end of the delivery tube is adapted to extend into the caustic to deliver the solvent for movement in a circular path.

The opening 14 is particularly adapted for providing access to the tube for cleaning the same by a device such as a wire.

Depending from the lower edge of the tower 11 and within the reservoir is an inverted conical funnel-like partition or baffle 17 having a central opening 18, and a tubular collar or flange 19 depends from the baffle, the axes of the opening and tubular flange being preferably in the axis of the tank, and the baffle and flange forming with the tank wall and annulus 12 an annular recess 20 for trapping fluid rising in the tank.

A vent pipe 21 is inserted in an opening 22 in the annulus for relieving air and gas trapped in the recess.

A plurality of conical partitions or baffles is preferably provided, a second baffle 23 being supported from the wall of the reservoir with its outer edge sealingly attached to the wall, having an opening 24 preferably concentric with the opening of the first named baffle and having a larger diameter than said opening, the second baffle forming a recess 25 with the wall of the reservoir.

The truncated apex of the baffle 23 is spaced from the bottom 9 a sufficient distance to permit the provision of a filtering body on the surface of the caustic in spaced relation with the baffle as illustrated in Fig. 1, whereby the solvent may rise to a level above the filtering body for access to the opening of the baffle.

Interposed in the return conduit 6 is a filter 26 including spaced baffle plates 27 forming chambers 28 and having openings 29 and 30 respectively in upper and lower portions of alternate plates for passage of liquid from one chamber to another, whereby the liquid is restricted to a tortuous course through the filter. Suitable filtering material 31 may be installed in the chambers.

A housing 32 is interposed in the return line between the first named filter and the tank, and preferably closely adjacent the tank, and spaced parallel vertical screens 33 are mounted in the housing with their lower edges engaging the bottom thereof.

A valve 34 in the return line between the screen housing and the filter controls flow of liquid passing from the screen housing into the return line toward the washer.

A drain pipe 35 controlled by a valve 36 leads from the lower end of the screen housing to a drain conduit 37, and drain pipes 38 inserted in the bottom of the filter chambers and provided with back check valves 39 are also connected with said conduit 37, which in turn is connected to the valved pipe 40 leading from the washer to the pump 4. When a valve 41 in the pipe 40 is closed and a drain conduit valve 42 is opened, the pump may drain material from the filter and deliver it through the conduit 5 to the tank; and when the valve 36 is also open, material will also be pumped from the screen housing to the tank.

Valved muck pipes 43 and 44 extend through the walls of the reservoir to the baffles, the inner ends of the pipes being mounted in baffle apertures 45 and flush with the upper slanting surfaces of the baffles, the pipes and the drain outlet 13 being connected to a muck pump 46 for withdrawing deposits, foul solvent and similar matter from the tank.

Matter suspended in the solvent will fall to the upper surfaces of the conical baffles, and I preferably provide stop flanges or walls 47 and 48 to prevent such matter from flowing through the openings 18 and 24 of the baffles 17 and 23 respectively, the walls comprising tubular members extending upwardly from the edges of the openings. The wall 47 may comprise an upward extension of the flange 19, and the wall 48 may comprise the upturned edge of the baffle at the opening. The walls 47 and 48 form recesses 49 and 50 with the upper surfaces of the baffles, and the muck pipes 43 and 44 communicate with the recesses for removal of material that falls on the baffles and moves downwardly thereover into the recesses.

Braces 51 may reinforce the inner edge of the annulus 12 for supporting the tower.

In operating a device constructed as described, and provided with a cleaning material such as caustic, the drain valves being closed, used solvent is pumped from the washer to the tank and delivered in a circularly moving stream into the body of caustic in the sump. The solvent moves in a substantially horizontal path through a substantial proportion of the caustic, whereby the contact of the solvent with caustic is enhanced.

Attention is particularly called to the circular travel of the solvent in the lower sump, whereby impurities are centrifugally thrown toward the walls, and therefore tend to pass downwardly over the conical bottom toward the central drain and are thus removed from the solvent rising in the tank.

The solvent rises through the caustic over substantially the whole surface thereof, so that all the deposit or soap bed that lies on the surface and comprises a filtering body is employed for filtering the solvent, and the solvent does not tend to break through the film and form channels.

The solvent rises further in the reservoir, but only a relatively small area of the surface of the solvent column has access to the opening in the partition or baffle, so that particles floating in the solvent tend to be trapped in the recess 25.

A further advantage of the transversely directed tube inlet and lower conical baffle is that the centrifugally moved impurities thrown to the outer portion of the lower sump, rise in the reservoir outside the area of the lower baffle outlet, and are trapped in the recess 25, while relatively pure solvent rises through the outlet.

The whirling motion of the solvent in the lower portion of the sump conferred by the character of the bottom and inlet tube, causes suspended impurities carried upward by the rising solvent to move toward the wall of the reservoir in the recess 25, and therefore tends to prevent the impurities from joining the stream of solvent rising through the baffle outlet.

The heavier impurities that move downwardly over the wall and upper surfaces of the conical baffle are trapped at the edge of the opening by the upwardly extending tubular wall, and prevented from return to the lower sump.

The solvent rising further toward the upper baffle has a restricted outlet through the tubular flange, and the major portions of air, gases and suspended particles, particularly particles that tend to rise in the solvent, move into the recess 20 and are trapped, the air and gases departing through the vent. The body of liquid above the upper conical baffle is relatively still and opportunity is given for impurities to separate by gravity from the solvent and fall to the surface of the baffle to be trapped in the recess 49.

The solvent, from which most of the impurities have been removed, moves then into the tower, and when the apparatus is being operated will cover the outlet and tend to move by gravity back to the washer through the screens and filter, in the illustrated application of the invention.

The return line valve 34 and washer line valve 41 may be closed and the drain valves 36 and 42 opened to permit drainage of material from the filter chambers and the screen housing. Since the material therein is relatively clean, it may be pumped into the tank for further cleaning without reducing the efficiency of the tank, and I prefer to return it to the tank and thus save the solvent.

Small foreign particles such as lint suspended in the solvent passing to the filter may carry moisture. The moisture-laden particles are caught by the filtering material, in the filter 26, and small amounts of water thus introduced, may collect at the bottoms of the filter chambers. I provide the pump-connected drain pipe and connect it through the pump with the tank, so that the material in the chambers may be removed and at the same time the solvent may be salvaged. When circulation through the washer is suspended, solvent substantially fills the filter.

If the valves are operated as above indicated, and the pumps actuated, the solvent will be drawn through the filtering material in the chambers and will dislodge the foreign moisture laden particles for cleansing the filter, the solvent carrying the moisture and foreign matter thus being delivered to the tank.

Because of the trapping of dirt and lint-like particles in the annular recesses of the tank, the removal of a relatively large proportion of the moisture-carrying particles, and the efficiency of the tank for removing such particles, solvent moving from the tank is relatively clean and free from moisture, and the filter, and similarly the screen housing, may be drained to the tank, and the pump and inlet line used for delivering foul solvent from the washer may move the solvent from the filter.

The operation of the apparatus described results in foul deposits on the upper surfaces of the conical baffles, which collect in the recesses 49 and 50, and these deposits and the material in the lower sump, may be removed by operation of the muck pump.

What I claim and desire to secure by Letters Patent is:

1. A solvent-treating device comprising a tank having an inwardly extending annulus at its upper edge provided with a vent, a tower of less diameter than the tank comprising an upward extension thereof supported by said annulus, a funnel-like member depending from the tower into the tank, and means for circulating solvent upwardly through the funnel-like member.

2. In a solvent-purifying device of the character described, a tank, a depending baffle in the tank having a central opening, and means for circulating the solvent including a tube having an open outlet end spaced laterally from said opening and directed horizontally transversely of the tank below the baffle.

3. In a solvent-purifying device of the character described, a tank, a depending baffle in the tank having a central opening which opens into the tank, and centrifugally operating means including a tube having an open outlet end located adjacent the side wall of the tank for circulating the solvent in the tank below the baffle.

4. In a solvent-purifyng device of the character described, a tank having a conical bottom and adapted to contain a solvent-cleaning material, a solvent-delivering tube having a curved outlet end located adjacent the wall of the tank, and a depending baffle in the tank having a central opening spaced from the position of the material and an outer edge sealingly connected to the wall of the tank.

5. In a device of the character described, a tank, depending transverse spaced partitions in the tank having aligned central openings and outer edges sealingly connected to the wall of the tank, and means including a tube having a curved outlet end for delivering liquid for flow in a circular path adjacent the wall of the tank.

6. A solvent-treating device comprising a cylindrical tank, a tower of less diameter than the tank comprising an upward extension thereof, a conical baffle having an apical opening which opens into the tank depending from the tower into the tank, a cylindrical collar depending from the baffle, and means including a tube having a curved outlet end portion conforming to the curvature of the tank for delivering liquid for travel in a circular path in the bottom of the tank.

7. In a system of the character described including a washer, a tank having an outlet adjacent its upper end, means including a pump for moving solvent from the washer to the tank, a conduit for gravity flow of solvent from the tank to the washer, and solvent-clarifying means in the tank, a filter housing interposed in the conduit, a drain pipe connected with the bottom of the filter, the pump being connected with the drain pipe for moving solvent from the filter to the tank, and valve means controlling the movement of solvent through the pump.

8. In clarifying apparatus of the character described including a purifying tank, an outlet conduit to a washer, an inlet conduit to the tank from the washer, a pump interposed in the inlet conduit and a filter interposed in the outlet conduit, a drain pipe inserted in the filter and connected with the inlet conduit through the pump for delivering of fluid from the filter to the tank.

9. In apparatus of the character described, in combination with a purifying tank, an outlet conduit connected with the tank, and a filter interposed in said outlet conduit, means including a pump and a drain pipe connected with the filter and connected with the tank through the pump for delivering dirty fluid to the tank.

10. A purifying tank having a vent to atmosphere adjacent the upper end thereof, a baffle depending in the tank forming therewith a pocket communicating with atmosphere through said vent, and means for delivering dirty fluid to the tank below said baffle.

11. In a device of the character described, a tank provided with a vent adjacent the top thereof, a funnel-like baffle depending in the tank spaced from one wall of the tank to form therewith an annular pocket at the upper end of the tank around the baffle, communicating with atmosphere through said vent and having an opening communicating with the tank substantially in the axis thereof, and means for delivering dirty fluid to the tank for upward flow through the baffle.

In testimony whereof I affix my signature.

GEORGE M. BUCEY.